FLUIDIZED BED COATING PROCESS
POWDER TEMPERATURE VS. PREHEAT TEMPERATURE

FLUIDIZED BED COATING PROCESS
POWDER TEMPERATURE VS. COATING THICKNESS

INVENTOR.
ERWIN GEMMER

May 11, 1965 E. GEMMER 3,183,113
FLUIDIZED BED COATING PROCESS AND APPARATUS
Filed Feb. 20, 1962 3 Sheets-Sheet 3

FLUIDIZED BED COATING PROCESS
DIP TIME VS. POWDER TEMPERATURE

FLUIDIZED BED COATING PROCESS
POWDER TEMPERATURE VS. POSTHEAT TIME

INVENTOR.
ERWIN GEMMER
BY Brumbaugh, Free, Graves and Donohue
his ATTORNEYS

３,183,113
FLUIDIZED BED COATING PROCESS
AND APPARATUS
Erwin Gemmer, Frankfurt am Main, Germany, assignor to Knapsack-Griesheim Aktiengesellschaft, Knapsack, near Cologne, Germany, a company of Germany
Filed Feb. 20, 1962, Ser. No. 174,605
10 Claims. (Cl. 117—21)

This invention relates to apparatus for and methods of coating articles, and more particularly to apparatus and methods of applying coating materials to the surface of various articles to form protective coatings thereon.

This application is a continuation-in-part of my co-pending application Serial No. 617,611, filed October 22, 1956, now abandoned, and of my application Serial No. 551,943, filed December 8, 1955, now abandoned.

It is often desirable to apply coating materials to the surfaces of thin articles or heat sensitive articles to form protective and decorative coatings thereon. Such coverings may be provided on articles which are exposed to normally destructive solvents, corrosive chemicals or which must be electrically insulated, or which must resist mechanical abrasive or frictional wear. Both metallic and non-metallic articles may require such protection.

Heretofore it has been customary to apply coatings by forming a solution or dispersion thereof in a liquid, and employing a painting or a spraying operation. However, the solvents and dispersing agents are usually expensive and give rise to many other problems.

In my application Serial No. 551,943, filed December 8, 1955, new and improved methods and apparatus for applying coating materials to the surfaces of articles are disclosed and claimed. These new methods and apparatus involve the formation of a fluidized bed of finely divided, free-flowing, powdered coating material consisting of a dense phase bounded by an upper free surface by passing an ascending current of gas through a laterally confined bed of said coating material. The article to be coated is heated to a temperature above the sintering point of the pulverulent coating material and at least partially immersed in the fluidized bed so that the article becomes coated by fusion of the coating material particles thereon. The apparatus disclosed comprises a container designed to laterally confine the bed of pulverulent coating material and having an opening through which articles to be coated may be inserted into the container for immersion in the bed, and a gas-pervious plate mounted in the container. A gas under pressure is supplied to the bottom side of the plate, which gas percolates upwardly through the plate and the bed thereby fluidizing the bed.

The fluidized bed should preferably be maintained at a temperature which is sufficient to prevent the accumulation of moisture in the bed. This can be conveniently accomplished by slightly raising the temperature of the gaseous medium. However, caution should always be taken to maintain the temperature of the gas and therefore, of the fluidized bed, below the sintering temperature of the coating material.

The fluidized bed coating process is essentially a fusion coating process in which reliance is usually placed upon the heat stored within the preheated article to fuse the pulverulent coating material in forming coatings thereon. Hence, the success of the process is largely dependent upon the provision of sufficient heat stored within the article to accomplish the production of the fused coating. The provision of sufficient stored heat is often a difficult problem, because many articles possess a low heat-storage capacity. For example, very thin sheets of metal dissipate heat extremely rapidly and have a low heat-storage capacity in relation to the area of surface to be coated. Furthermore, in some instances it may be practically impossible to preheat articles sufficiently to fuse coating materials thereon because of their heat destructible nature, as in the case of non-heat-resistant glass articles. In the case of articles made of wood, the articles may become charred or actually burn during attempts to preheat them. The problem of providing sufficienth eat stored within the article to be coated is aggravated by heat losses which may occur during the immersion of the article in the fluidized bed. Contact of the immersed article with the agitated particles of coating material in the fluidized bed and with the gas flowing therethrough has a normal tendency to cool the article.

The thickness of the coating material is largely regulated according to said prior application by controlling the preheat temperature of the article and the time of immersion. Thicker coatings may be produced by either longer dipping time or higher preheat temperatures. The precise relationship among these variables is affected by the shape, size and thickness of the article to be coated and by the sintering temperature of the coating material.

That application also discloses that when the article is removed from the fluidized bed the coating in some cases may be rough or discontinuous. In such cases a smooth continuous coating may be obtained by allowing additional time for the coated material to melt and coalesce. This is preferably carried out in a post-heating oven where the coated article may be allowed to soak for a period of about five to ten minutes.

An object of the present invention is to provide new and improved methods of and apparatus for applying coating materials to the surface of various articles to form protective coverings thereon.

Another object of the invention is to provide new and improved methods of and apparatus for reducing heat losses of articles being coated by a fluidized bed coating process.

Another object of the invention is to provide new and improved methods of and apparatus for coating heat destructible articles by a fluidized bed coating process.

Another object of the invention is to provide new and improved methods of and apparatus for applying protective coverings of coatings of substantially dry compositions to the surfaces of articles without employing solvents or dispersing agents.

Another important object of the invention is to provide new and improved methods of and apparatus for applying protective coverings of coating materials to the surfaces of articles having complex or irregular shapes, and articles which are too thin or fragile to be coated effectively by prior methods.

Another important object of this invention is to provide an improved fluidized bed immersion coating process for the production of coatings by fusion of the coating material which is much more rapid than prior processes.

Other objects and advantages will become apparent from a study of the following detailed description of the invention.

In carrying out the method of this invention in a preferred form, the following steps are employed: supplying external heat above ambient (i.e., atmospheric) temperature to a fluidized bed of finely divided free-flowing powdered coating material and to the fluidizing gas thereby to heat said bed and gas to a temperature which is above ambient temperature but does not exceed the sintering point of the coating material, heating an article to be coated to a temperature above the sintering point of the coating material, and immersing the heated article in the heated fluidized bed so that it becomes coated by fusion of the coating material particles thereon. By ambient temperature I mean the operating temperature that the bed would normally assume in the absence of external heat due to environmental conditions, including the room air temperature and the effect of the coating steps and operations performed in and about said bed. In the practice of this invention, either the fluidizing gas, or the pulverulent resin forming the bed, or both of them, is heated to a temperature at least 25° above ambient temperature. This 25° F. differential, attained by means of externally supplied heat, has been found to be a practical minimum sufficient to reduce at least one or more of the factors preheat time and dip time and to otherwise materially improve the process in terms of increased coating thickness and/or shorter postheat times.

The articles to be coated may be composed of various metallic materials, such as, for example, steel, iron, aluminum, copper, zinc, as well as alloys thereof; or the articles may be constructed of non-metallic materials such as, for example, glass, ceramics, wood, and the like. Some of the articles may possess irregular or complex shapes. Such articles may include, for example, wrenches, hammers, pliers, bolts, pins, tubular sleeves, hooks, clamps, plating racks, anode hangers, ventilators, gears, pump housings, sieves, screens, switches, electrical fittings, tanks and other vessels, protective caps, brushings, bellows, and other tools, hardware or equipment.

Many different coating materials may be employed in the present invention. The invention is of particular merit for the application of coatings of high molecular weight, polymeric thermoplastic resins. Among the most useful of these resins are nylon and polyethylene. Included among other useful resins are polystyrene, polymethylmethacrylate, silicone and epoxy resins. Other useful coating materials may include porcelain, metallic lead and zinc, glass, shellac, wax, and bituminous products, such as gilsonite and asphalt. The coating materials may be either pure compounds or formulated compositions. Various compatible mixtures of these materials may also be employed, and suitable fillers and plasticizing agents may be incorporated therein.

Articles of almost any material can be coated if the material can be heated safely to a temperature above the sintering temperature of a suitable coating material. Similarly, almost any material can be used for the production of coatings if it can be obtained in a free-flowing pulverulent form and if it is capable of sintering into a satisfactory coating at a temperature to which the article to be coated can be heated.

A preferred form of apparatus for the practice of the invention includes a container designed to confine a bed of finely divided free-flowing powdered coating material, said container having an opening through which articles to be coated may be inserted into the container and immersed in the bed, a gas-pervious plate mounted in the container, means for supplying a gas under pressure across the bottom side of the plate, which gas may percolate upwardly through the plate and the bed thereby fluidizing the bed, and means for heating the bed of coating material and the gas.

A complete understanding of the invention may be obtained from the following detailed description, when read in conjunction with the accompanying drawings, in which:

FIG. 3 is a graph showing the pre-heat temperature as a function of bed temperature to obtain a constant coating thickness.

FIG. 4 shows the dip time as a function of powder temperature necessary to apply a constant coating thickness.

FIG. 5 shows the coating thickness as a function of powder temperature at a constant dip time.

FIG. 6 shows the post-heat time as a function of powder temperature necessary to fuse a coating of a constant thickness.

Figure 1:
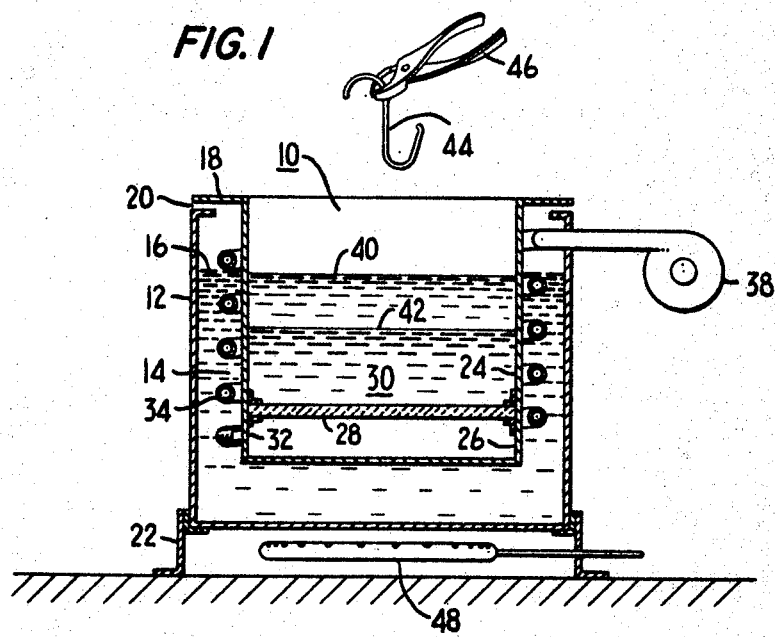
FIG. 1 is a side elevation view, partially in section, of a preferred form of apparatus for carrying out the invention.

Referring to FIG. 1, the apparatus shown includes an open-topped container 10 surrounded on its sides and bottom by a jacket 12. The container 10 may be either rectilinear or cylindrical in configuration, or it may have any other suitable polygonal shape providing a relatively large internal volume and an extensive upper surface area readily accessible for inserting articles to be coated therein through the open top of the container. Ordinarily, the side walls of the container 10 are disposed perfectly vertically, but in some cases it may be considered desirable to have these walls inclined outwardly as they extend upwardly, in order to increase the upper surface area of the container relative to the lower portions thereof. The jacket 12 contains a fluid heat transfer medium 14 maintained in sufficient volume to reach an upper level 16 located near but slightly below the top of the jacket 12. A horizontal plate 18 projects outwardly from the periphery of the upper end of the container 10 and covers the top of the jacket 12, but small openings 20 provided to relieve any pressure which might otherwise build up within the jacket by vaporization of the fluid 14. The jacket 12 and with it the container 10 are supported at a suitable elevation above floor level by legs 22.

The container 10 is partitioned into a large upper chamber 24 and a small lower chamber 26 by means of a porous plate 28 mounted horizontally and extending completely across the container 10 a short distance above its bottom. The porous plate 28 is pervious to a gas introduced under pressure into the lower chamber 26, thereby permitting the gas to percolate upwardly into the upper chamber 24, but the plate 28 is impervious to the finely divided particles of substantially dry coating material in bed 30 contained within the upper chamber 24. The porous plate 28 is preferably made of an "Alundum" refractory ceramic material composed of fused alumina grains bonded together by an aluminous glass at a high firing temperature. Fine mesh screens may be used in place of a porous plate if convenient. Similarly plates with a few relatively large holes are also operable to distribute the fluidizing gas.

It is evident that the gas-pervious plate 28 functions as the bottom of the chamber 24. Hence, instead of having the plate 28 partition the container 10 to form upper and lower chambers 24 and 26, respectively, the plate 28 may serve as the bottom of the container holding the coating material, and any suitable connection may be employed to supply the gas uniformly across the bottom side of the plate 28.

Gas under pressure is introduced into the lower chamber 26 through an inlet opening 32, which may be located at any point on the sides or bottom of the chamber 26 below the plate 28. The inlet opening 32 is connected to the lower end of a tube 34 mounted within the jacket 12 and spirally encircling the container 10 from a point near the top thereof down the opening 32. The upper end of the tube 34 projects outwardly through the wall of the jacket 12 and is connected to a source 38 of gas under pressure. When the gas employed is ordinary air, the gas source 38 may be a suitable blower, fan or conventional air compressor. In the event it is considered more desirable to employ nitrogen or some other inert gas, the gas source 38 may be a steel bottle containing compressed gas at pressures up to 15 atmospheres. Depending upon the size of the container 10 and other factors, the gas consumption may range up to about 700 cubic feet per hour.

The container 10 and the entire bed 30 of finely divided particles of coating material are heated by transfer of heat from the fluid medium 14 contained in the jacket 12 surrounding the container 10. For this reason it is desirable for the upper level 40 of the bed 30 when fluidized to be approximately even with the upper level 16 of the fluid 14. Mounted beneath the jacket 12 is a heating unit 48 which transmits heat to the fluid 14. The unit 48 may be a gas ring burner, an electrical resistance coil, or any other suitable type of heater. Heat is transmitted from the fluid 14 to the gas flowing through the spiral tube 34 as well as to the side walls of the container 10. Consequently, the entire bed 30 of coating material becomes heated as well as the gaseous fluidizing agent flowing through the bed.

The fluid medium 14 is preferably a liquid having a boiling point which is just below the sintering point of the powdered coating material used so as to automatically control the temperature at exactly the right level by maintenance of the liquid at its boiling temperature. This provides an extremely simple arrangement for holding the precise temperature required. Water meets the requirements of this liquid when the coating material is polyethylene. An oil having a boiling point above 212° F. is more suitable when the coating material is a nylon compound. Other liquids having suitable boiling points may be chosen to match the sintering points of other coating materials. When using some materials, such as polyethylene and nylon, it usually takes more than an hour of heating in preparation for a coating operation until the temperature of the bed of coating material approaches the temperature of the fluid heat transfer medium 14. The bed also remains hot for several hours after it has been heated. It will be understood, of course, that many of the advantages of this invention may be achieved by the production of coatings prior to the achievement of the complete heating of the fluidized bed.

The gas introduced through the inlet opening 32 fills the lower chamber 26 at an essentially equal pressure in all portions thereof, and it percolates upwardly through all portions of the porous plate 28 at substantially the same rate of flow. Above the plate 28 the gas ascends in a myriad of tiny streams flowing upwardly at a substantially uniform speed, pervading the entire bed 30 of finely divided particles of coating material. In the interior of the bed 30 the finely divided particles become thoroughly agitated by the ascending streams of gas, and on the upper surface of the bed a myriad of small, ever-changing blowholes or craters appear. Under these circumstances the bed 30 behaves substantially like a fluid, and the term fluidized is used to describe its condition. The rate of flow of the gas is preferably regulated at a value just sufficient to fluidize the bed 30, and the flow is prevented from becoming unmanageably violent.

A fluidized bed has been defined as a mass of solid particles which exhibits the liquid-like characteristics of mobility, hydrostatic pressure, and an observable upper free surface or boundary zone across which a marked change in concentration of particles occurs. A fluidized bed differs from a dispersed suspension in that in a suspension an upper level or interface is not formed. In general a dispersed suspension is analogous to a vapor, whereas a fluidized bed is analogous to a liquid. In a vessel containing a fluidized bed there is a dilute suspension of entrained particles above the bed which is such a dispersed suspension, and it is referred to as the disperse phase, while the bed itself is referred to as the dense phase.

When the bed 30 of finely divided particles of coating material is in its fluidized condition, the large volume of gas flowing through and pervading the bed causes the bed to increase in volume in comparison with its volume when the supply of gas is shut off. Due to the fact that the bed 30 is confined laterally by the side walls of the container 10, the increase in the volume of the bed is evidenced by rising of its upper level. By way of illustration, the upper level of the bed 30 when it is fluidized is indicated at 40, and its upper level when the supply of gas is shut off is indicated at 42. It is desirable for the upper level 40 of the bed 30 to be approximately even with the upper level 16 of the fluid 14 in the jacket 12. The increase in volume represented by the difference between the levels 40 and 42 is dependent upon the rate of gas flow and upon the size, shape and density of the particles of coating material in the bed 30. In general, the smaller and lighter particles show larger increases in volume upon fluidization. The increase may range from about 20 percent to about 120 percent of the initial volume of unfluidized material.

In one coating operation employing finely divided particles of high molecular weight polyethylene as the coating material, the bed of coating material increased in depth from about 6½ inches to about 9 inches upon fluidization. Under similar conditions a bed of nylon particles increased in depth from about 7¾ inches to about 9½ inches upon fluidization. In each of these cases the particles were granular in form and ranged in size between about 0.001 and about 0.024 inch. Best results have been obtained with particle sizes in the range between about 0.002 and about 0.012 inch.

Although the double-walled jacketed container structure illustrated in FIG. 1 represents a preferred apparatus embodying the invention, it is evident that other apparatus may be devised to perform the same function. The container of coating material may be heated without the double-walled jacketed structure and without the careful selection of a heating liquid having a particular melting point related to the sintering temperature of the coating material if more elaborate temperature control apparatus is employed. The gaseous fluidizing agent may be preheated separately, and the container for the coating material may be heated directly without employing a fluid heat transfer medium, provided the heat is applied thereto over a large area and is controlled properly.

Figure 2:
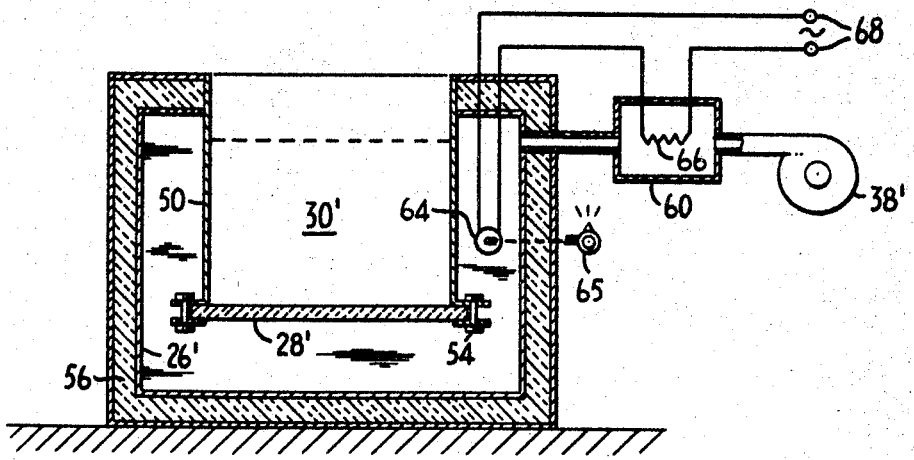
FIG. 2 is a partially sectional, side elevation view of a second preferred form of apparatus for carrying out the invention.

In FIG. 2 there is shown an alternative embodiment of apparatus for carrying out the present invention in which the fluidizing gas itself serves as the heating fluid for the container and for the fluidized bed. Referring to FIG. 2, a container 50 open at its top is provided at its bottom with a gas-pervious plate 28' which is secured thereto by clamps 54. A bed 30' of finely divided powdered coating material is laterally confined by the container 50 and supported on the plate 28'. When a gas is supplied under pressure uniformly across the bottom side of the plate 28', it percolates upwardly through the plate in a myriad of tiny parallel streams to fluidize the bed 30'. When the gas is ordinary air it may be supplied by a blower 38' or any equivalent source, such as an air compressor. The gas supplied by the blower first passes through a heat exchanger 60 and thence into a pressure chamber 26' surrounding the container 50. The sides of the chamber 26' are joined to the top of the container 50, but they are spaced a substantial distance from the side walls of the container 50 and from the plate 28' in order to confine a large volume of gas surrounding the sides and the bottom of container 50. The walls of the chamber 26' are insulated with a suitable heat insulating material 56, while the walls of the container 50 are composed of a metallic heat conductive material. Hence, the heated gas in the chamber 26' transmits heat into the container 50, thereby heating the entire bed 30' being fluidized by the gas at the same time. The heat input to the heat exchanger 60 is automatically controlled by a temperature responsive device such as a conventional thermostat 64 located in the chamber 26'. As indicated, the thermostat 64 may be remotely adjustable by means of an adjusting knob 65. In the drawing the heat exchanger 60 is shown provided with an electrical resistive heater 66 which may be connected through the thermostat 64 to a conventional source of electrical current at the input terminal 68. It is obvious that other heat sources may be employed for this purpose. By this arrangement the gas filling the pressure chamber 26' can be brought to a temperature approaching but not exceeding the sintering point of the pulverulent coating material in the bed 56.

Coating is accomplished by preheating the article to be coated to a temperature above the sintering point of the pulverulent coating material, immersing the heated article in the warmed fluidized bed of the pulverulent coating material, and holding the article immersed in the bed for a predetermined short period of time until it becomes coated by fusion of the coating material particles thereon. The term "sintering point" as here used refers to that state wherein the coating material is sufficiently tacky or sticky to adhere to the surface of the article.

The period of immersion may vary between relatively wide limits depending upon the thickness of the coating desired and the nature of the article being coated. An immerision time of less than fifty seconds is usually adequate, and preferably the period is less than thirty seconds. The thickness of the coatings produced by methods embodying the invention may vary over a wide range, depending primarily upon the nature and particle size of the coating material, the preheating temperatures employed, and particularly the length of the immersion time.

Immersion may be effected simply by employing a pair of ordinary tongs to grasp the preheated article to be coated, manually dipping the article into the fluidized bed of coating material, moving the article to and fro or up and down within the bed for the required length of time, and then withdrawing the article. Referring again to FIGS. 1 and 2, a conventional plating hook 44 which is about to be coated, is shown engaged by a pair of tongs 46 and suspended above the container 10. By employing suitable racks, several articles may be coated simultaneously in the same bed. Continuous coating operations may be performed by employing conveyors having article-carrying hooks arranged to travel into and out of a fluidized bed of coating material.

One of the advantages of the present invention is the ease of forming continuous uniform coatings on articles having complex or highly irregular configurations. Upon immersion of the article to be coated in the fluidized bed, the agitated particles of coating material flow into every exposed crevice, channel, groove, hole, and the like, in every contacted portion of the article. Of course, in some instances, it may be desirable to mask portions of the article to prevent exposure to the coating material, and for this purpose certain well known silicone greases are particularly suitable. As the agitated particles in the fluidized bed strike the exposed portions of the preheated article, the particles instantly melt and rapidly coaleces to form an adherent, continuous, thin coating on the article.

After holding the article in the bed for the proper period of time to build up the coating to the desired thickness, the article is withdrawn from the bed. When it is first withdrawn from the bed the coating on the article appears to be rough and covered by loosely clinging granules of the coating material. Ordinarily, after holding the article in the air at normal room temperature for a short period of time, the adhering granules may be observed to fuse and become transformed into a smooth continuous coating. This effect is due to the gradual transfer of heat stored in the interior of the article.

Preheating of the article may be performed in any conventional heating apparatus preferably having means for controlling the temperature. Several factors must be considered in selecting the proper preheating temperature. The sintering point of the coating material must be considered, since the preheating temperature of the article should be above the sintering point of this material. Another important factor to consider is the heat-storage capacity of the article being coated, since reliance is placed primarily upon the stored heat to fuse the coating material in forming the initial coating, and such heat may also assist in gradually melting clinging particles of the coating material after the article is removed from the fluidized bed. Hence the low heat-storage capacity of articles which are very small or very thin may require the use of higher preheating temperatures.

When the heat-storage capacity is very small, or when there is only a small temperature difference between the sinering point and the decomposition point of a coating composition, it may be advantageous to preheat the article somewhat above the decomposition point of the coating composition. In such instances, the temperature of the initial coating may not be elevated for a time sufficient to cause any appreciable decomposition or degradation. In any case, only the initial coating layers are subjected to slight degradation which may improve the adhesion of the entire coating. Due to the low thermal conductivity of the plastics compositions, the layer of decomposed material will be very thin, and it will be completely covered by undecomposed coating material. For coating with high molecular weight polyethylene, the preheating temperature of metallic articles may range from about 375° F., to about 720° F.

The present invention is particularly directed to the method including the elevation of the temperature of the entire fluidized bed and the fluidizing gas above the ambient temperature but not exceeding the sintering point of the powdered coating material. This feature makes it possible to coat low heat-storage capacity articles and other articles to which high temperatures cannot be applied, or articles having low heat conductivity. For example, in coating heat destructible articles, such as articles made of non-heat-resistant glass, it may be impossible to preheat sufficiently to fuse coatings thereon, unless the entire fluidized bed is also heated. Also, even where an appreciable amount of heat storage can be obtained in such non-heat-resistant glass, if the fluidized bed and the fluidizing gas are not heated, immersion of the heated glass article results in such a high degree of thermal shock that the article is shattered. This difficulty is avoided when the fluidized bed and the fluidized gas are warmed in accordance with the present invention. Some delicate wooden articles may become charred or actually burn during attempts to preheat such articles to a temperature sufficiently high to form a fused coating in an unheated fluidized bed of coating material. Heating of the fluidized bed helps to avoid heat losses during the formation of the coating, because contact of the immersed article with the agitated particles in the fluidized bed and with the gas flowing therethrough would tend to cool the article unless the bed and the gas were also heated. Consequently, by heating the fluidized bed more efficient use is made of the heat stored within the articles in the fusion coating operation.

Figure 3:
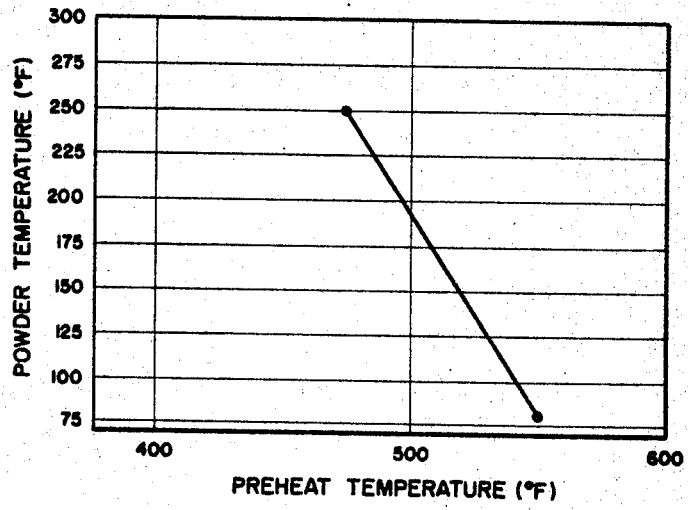
FIGURES 3, 4, 5 and 6 show the results of experimental tests made to illustrate the relationships between powder temperature, coating thickness, pre-heat temperature, dip time, and post-heat time.

The reduction in the required preheat temperature when coating with a heated bed is illustrated in FIG. 3. This figure relates specifically to coating a ½" diameter steel rod. The precise relationship between the required preheat and the bed temperature is a function of the powder being used, the shape of the object and the material of construction. Generally the qualitative relationship will remain the same as shown in FIG. 3. Increasing the powder temperature will reduce the required preheat temperature with the greatest reduction in preheat being obtained at the highest bed temperature.

Even for articles having sufficient heat-storage capacity and other characteristics which would permit high preheating temperatures and the production of satisfactory coatings without the heating of the fluidized bed, the present invention including the feature of heating of the entire fluidized bed permits the use of lower preheating temperatures for the articles, shorter periods of time for preheating the articles, and shorter periods of immersion in the fluidized bed. All of these reductions in operating time may be extremely important where high production operations are involved.

Figure 5:
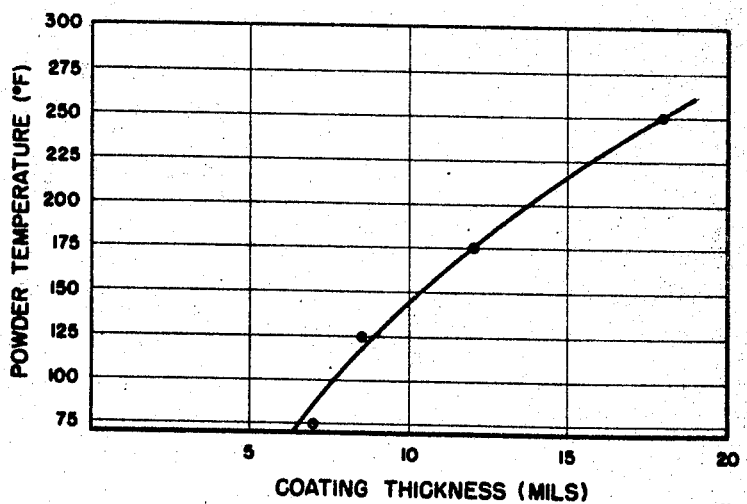
Figure 4:
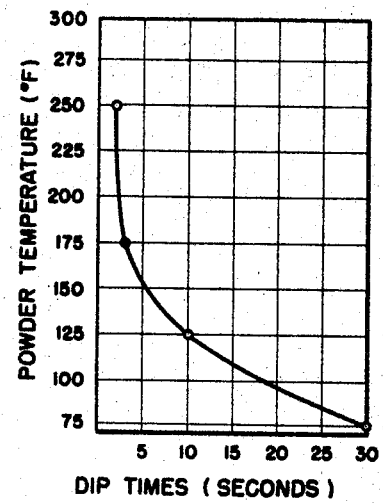

FIGS. 4 and 5 show typical results obtained in the coating of nylon on test steel panels 1/16 of an inch thick. A different shape or size of the article to be coated would give somewhat different results. Similarly, a change in the coating material will cause a shift in the example curves given. However, as a general result it may be stated that at a constant coating thickness increasing the powder temperature will reduce the dip time required to obtain the coating, with a maximum reduction in time obtained at a temperature approaching, but not exceeding the sintering temperature of the coating material. Similarly, at a constant coating time, increasing the powder temperature will increase the thickness of coating obtained, with the maximum thickness being obtained at a temperature approaching, but not exceeding the sintering temperature of the coating material.

For articles having a low heat storage capacity or which are relatively cool when withdrawn from the bed, the heat transfer from the interior of the object may be insufficient to coalesce and smoothen the coating. In these cases a post heating period may be required. Usually a blast of air is first employed to blow off excess clinging particles of the coating material. Any suitable oven may be employed for postheating the coated articles. With some materials a flame from a gas torch may be rapidly played directly over the surface of the coating to smoothen it. Heating the coated article for a period of about 5 to 10 minutes is the preferred method of accomplishing the required "smoothing."

Figure 6:
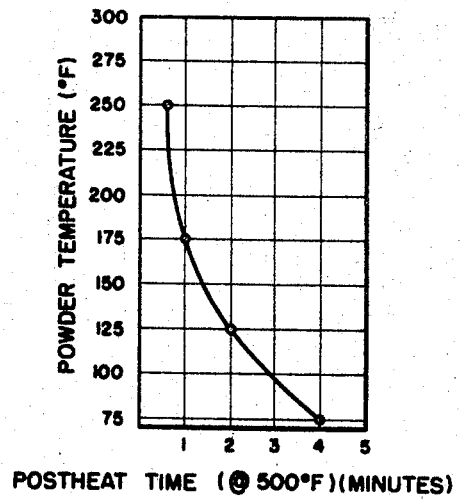

Increasing the powder temperature in the fluidized coating bed will reduce the post-heat time required to fuse the coating on the article to a smooth continuous surface in such an oven. FIGURE 6 shows a typical result obtained in coating nylon on a test steel panel. The use of a different size or shaped article to be coated would cause a shift in the illustrative curve of FIG. 6. Similarly, the use of a different powder will cause a shift in the curve of FIG. 6. It may be stated as a general rule that increasing the powder temperature of a fluidized bed of coating material will reduce the post-heat time required with a maximum reduction in post-heat time being obtained as the temperature of the fluidized bed approaches the sintering temperature of the coating material.

Finally, the coated articles are cooled, and this is ordinarily done slowly by allowing the articles to stand in atmospheric air or a non-oxidizing atmosphere maintained at normal room temperature. For some coating materials it may be preferable to rapidly cool the coatings, which may be done by quenching them in cold water.

The following examples illustrate typical practice of the process of the present invention, but these examples should not be interpreted as limiting the scope of the invention.

*Example 1*

A steel plate, the dimensions of which were 8.0 inches by 16.0 inches by 0.12 inch, was preheated to about 2000° F., and then immersed in a fluidized bed of enamel powder (ceramic frit) for about 30 seconds. The fluidizing gas in this case was nitrogen. The resulting coating had a thickness of about 0.016 inch, was as smooth as a mirror and was free of pores and other faults.

The preheating temperature had to be accurately controlled since too low a temperature tended to prevent complete fusion, while too high a temperature would have caused the appearance of a yellow tint in the coating followed by the appearance of blisters. In order to reduce heat losses during the immersion in the fluidized bed, it was found advisable to maintain the fluidizing gas at about 400° F.

*Example 2*

A piece of pre-dried alder wood was preheated to about 300° F. and was then immersed, for a period of between about 25 to 30 seconds, in a fluidized bed of polyethylene having a particle size similar to that in Example 1. The fluidizing gas was nitrogen having a temperature of between 212° F. and 221° F. Nitrogen was used instead of air to avoid damage to the polyethylene. Since wood will burn at high temperatures the preheating temperature had to be relatively low and, as a result, the immersion time had to be correspondingly longer. The resulting coating layer had a thickness of about 0.016 inch. A subsequent heat treatment for smoothing purposes was accomplished by a quick pass with a small gas flame.

*Example 3*

A ½ inch diameter by 2½ inch long aluminum rod was coated with a polyethylene coating material. The test part was preheated in a 600° F. oven for a period of 15 minutes. The part was coated for a period of 6 seconds in a fluidized bed according to Example 2. With the bed at room temperature (70° F.) a 9 to 10 mil coating was obtained. When the powder was heated to 120° F. the coating thickness obtained in this process was increased to 11 to 13 mils.

*Example 4*

A test panel of 1/16 inch cold rolled steel was coated by the fluidized bed coating technique with a nylon coating powder. The panel was preheated to 550° F. and dipped for a period of 10 seconds. When the bed was at room temperature a coating thickness of about 7 mils was obtained, however, this coating was discontinuous. This procedure was repeated with a bed temperature of 125° F. A coating thickness of 8 to 9 mils was obtained, which was continous. The process was again repeated at 175° F., and a coating thickness of 12 to 13 mils was obtained. At 250° F., a coating of 17–19 mils was obtained. In all of these procedures the test panel was postheated for 2 minutes in a 500° F. oven. These results are shown graphically in FIG. 5.

*Example 5*

A ½ inch diameter by 2½ inch long sample steel rod was coated to determine the maximum coating thickness. The coating composition was acellulosic material. Heating the part to 520° F. and dipping in a powder at room temperature produced a maximum coating thickness of 14 mils. Heating the part to 400° F. and dipping at a powder temperature of 160° F. gave a maximum coating thickness of 35 mils.

*Example 6*

A test panel of cold rolled steel 1/16 inch thick was coated with a nylon coating material. The panel was heated to 550° F. and the bed was at room temperature. An 8 mil coating thickness was obtained when this part was dipped for a period of one minute in the fluidized bed. Post-heating in an oven of 500° F. for a period of 4 minutes was required to obtain a smooth coating. This procedure was repeated with a bed temperature of 175° F. A dip of 3 seconds duration produced a coating thickness of 8 to 9 mils. Only 1 minute at 500° F. was required to obtain a smooth coating.

This procedure was also repeated at 125° F. and 250° F. The results of these four tests are shown in FIGS. 4 and 6.

*Example 7*

A 1/16 inch piece of cold rolled steel was preheated at 600° F. and coated by the fluidized bed coating technique. The coating material was a "Penton" powder. Penton is a chlorinated polyether plastic. With the bed at room temperature, a coating thickness of 8 mils was obtained. With the bed at 185° F., it was only necessary to preheat the panel to 450° F. to obtain a coating thickness of 13.5 mils.

A similar procedure was used to coat a ½" steel rod with a nylon coating powder. FIG. 3 shows the pre-heat temperature vs. powder temperature to obtain an 11 mil coating when using a 5 second dip time.

These examples and FIGURES 3, 4, 5 and 6 are illustrative of the result obtained by using the temperature of the fluidized bed of coating material as a process variable. The quantitative result obtained will vary with different size and shaped pieces to be coated and will vary with the coating material used. Therefore it is not intended to limit this invention solely to the quantitative data given in FIGURES 3, 4, 5 and 6.

The following claims are intended to define the scope of this invention over the prior art, and to cover all equivalents and modification thereof.

I claim:

1. An apparatus for coating articles comprising a container having an open top through which articles to be coated may be inserted and immersed into a fluidized bed of finely divided particles of coating material confined therein, a gas pervious ceramic plate mounted horizontally in the container to partition the container into an upper chamber for containing the bed of coating material and a lower chamber, a jacket surrounding the sides and bottom of said container for containing a liquid heat transfer medium having a boiling point below the melting point of the coating material, a helical gas supply tube positioned around the container within the jacket and connected to said lower chamber, connections for supplying gas under pressure through the tube and said lower chamber and said plate to fluidize the bed, and a heating unit mounted adjacent to the jacket for transmitting heat through the liquid transfer medium to the fluidized bed and to the gas.

2. An apparatus for coating articles comprising a container having an open top through which articles to be coated may be inserted and immersed in a fluidized bed of finely divided particles of coating material confined therein, a gas pervious ceramic plate mounted horizontally and extending completely across the container in spaced relation to the bottom portion thereof to partition the container into an upper chamber for containing the bed of coating material and a lower chamber, a jacket surrounding the sides and bottom of said container, said jacket containing a liquid heat transfer medium having a boiling point below the melting point of the coating material, a gas supply tube extending helically around the container through the liquid in the jacket, one end of said tube communicating with the exterior of said jacket, and the other end of said tube communicating with said lower chamber, connections for supplying gas under pressure to said first mentioned end of said tube for passage through said tube and said lower chamber and upwardly through said plate to fluidize the bed of coating material, and a heating unit mounted beneath said jacket for transmitting heat through the liquid transfer medium to the fluidized bed and to the gas.

3. A method of coating articles comprising the steps of introducing a gas into a bed of finely divided free-flowing powdered coating material to fluidize the bed, supplying external heat above ambient temperature to the fluidized bed thereby to heat said bed to a predetermined temperature above ambient temperature and approaching but not exceeding the sintering point of the coating material, heating an article to be coated to a temperature above the sintering point of the coating material, and immersing the heated article in the heated fluidized bed.

4. A method of coating articles comprising the steps of supplying external heat above ambient temperature to a gas thereby to heat said gas to a temperature above ambient temperature and approaching but not exceeding the sintering point of a finely divided powdered coating material, introducing the gas while heated to said temperature into a bed of said powdered coating material to fluidize the bed, heating an article to be coated to a temperature above the sintering point of the coating material, and immersing the heated article in the heated fluidized bed to form a coating by adhesion of the coating material particles thereon.

5. A method of coating articles comprising the steps of supplying external heat above ambient temperature to a gas, thereby to heat said gas to a temperature above ambient temperature and approaching but not exceeding the sintering point of a finely divided powdered coating material, introducing the heated gas into a bed of said powdered coating material, flowing the gas upwardly through the bed at a rate sufficient to fluidize the bed, supplying external heat above ambient temperature to the sides of the fluidized bed thereby to heat said bed to a temperature which is also above ambient temperature and approaches but does not exceed the sintering point of the powdered coating material, heating an article to be coated to a temperature above the sintering point of the powdered coating material, and immersing the heated article in the fluidized bed so that it becomes coated by adhesion of the coating particles thereto.

6. A method of applying protective coatings to the surfaces of articles comprising the steps of introducing a gas into the bottom of a bed of finely divided particles of substantially dry coating material having a predetermined melting point, flowing the gas upwardly through the bed over its entire area in a myriad of tiny streams at a rate sufficient to fluidize the bed, supplying external heat above ambient temperature to the gas and the entire fluidized bed thereby to heat said gas and bed to a predetermined temperature above ambient temperature and approaching but not exceeding the melting point of the coating material, heating an article to be coated to a temperature above the melting point of the coating material, dipping the preheated article into the heated fluidized bed, holding the article immersed in the bed for a predetermined short period of time until it becomes coated by melting of the particles thereon, withdrawing the coated article from the bed, blowing off any excess particles of coating material clinging loosely to the coated article, reheating the article to a temperature sufficient to coalesce and smoothen the coating thereon, and then cooling the article to solidify the coating.

7. In a fusion-coating process for forming a layer of material on an article by passing a current of gas through a bed of solid pulverulent layer-forming material to fluidize the bed and to form a mixture comprising two constituents, the first constituent being said layer-forming material and the second constituent being said gas and immersing the article to be coated in said fluidized bed while the article is heated to a temperature above the sintering temperature of said material, the improvement which comprises, supplying external heat above ambient temperature to at least one of said constituents thereby to heat said constituents to a temperature of at least 120° F. but below the sintering temperature of said layer-forming material, said externally supplied heat being sufficient to reduce at least one of the factors (1) article preheat temperature and (2) dip time, below that article preheat temperature and dip time which would be required to obtain an equivalent thickness of coating in the absence of such externally supplied heat.

8. A fusion-coating process of forming a layer of material on an article which comprises supplying external heat above ambient temperature to a quantity of gas, forming a fluidized bed by passing said gas through a mass of solid pulverulent layer-forming material while maintaining said gas at a temperature of at least 120° F. but below the sintering temperature of the layer-forming material, said externally supplied heat being sufficient to reduce at least one of the factors (1) article preheat temperature and (2) dip time, below that article preheat temperature and dip time which would be required to obtain an equivalent thickness of coating in the absence of such externally supplied heat, and immersing the article to be coated in said fluidized bed while the article is heated to a temperature above the sintering temperature of said material.

9. A fusion-coating process of forming a layer of material on an article which comprises supplying external heat above ambient temperature to a bed of solid free-flowing pulverulent layer-forming material thereby to heat said bed to a temperature of at least 120° F. but below the sintering temperature of said material, said externally supplied heat being sufficient to reduce at least one of the factors (1) article preheat temperature and (2) dip time, below that article preheat temperature and dip time which would be required to obtain an equivalent thickness of coating in the absence of such externally supplied heat, introducing a gas into the bed of material to form a fluidized bed, and immersing said article to be coated in said fluidized bed while said article is heated to a temperature above the sintering temperature of the material.

10. A fusion-coating process forming a layer of material on a heated article which comprises supplying external heat above ambient temperature to a bed of solid, free-flowing, pulverulent layer-forming material thereby to heat said bed to a temperature of at least 120° F. but below the sintering temvperature of said material, said externally supplied heat being sufficient to reduce at least one of the factors (1) article preheat temperature and (2) dip time, below that article preheat temperature and dip time which would be required to obtain an equivalent thickness of coating in the absence of such externally supplied heat, and immersing said heated article to be coated in said fluidized bed whereby a layer of said layer-forming material is formed on said article.

References Cited by the Examiner
UNITED STATES PATENTS

| | | | |
|---|---|---|---|
| 555,210 | 2/96 | Collins | 118—423 X |
| 1,534,846 | 4/25 | Fraser et al. | 209—474 |
| 2,038,251 | 4/35 | Vogt | 117—100 |
| 2,123,537 | 7/38 | Marr | 117—31 |
| 2,135,081 | 11/38 | Kaplan | 117—113 |
| 2,254,483 | 9/41 | Hess et al. | 117—21 |
| 2,350,743 | 6/44 | Fordyve et al. | 117—113 |
| 2,704,726 | 3/55 | Pawlyk | 117—50 |
| 2,414,625 | 1/47 | Abrams et al. | 252—190 |
| 2,708,622 | 5/55 | Stone. | |
| 2,728,686 | 12/55 | Borushko | 118—423 |
| 2,729,194 | 1/56 | Jones | 118—308 |
| 2,729,598 | 1/56 | Farbo | 202—25 |
| 2,785,478 | 3/57 | Audas et al. | 34—9 |
| 2,786,801 | 3/57 | McKinley et al. | 117—100 |
| 2,812,269 | 11/57 | Ransburgh | 118—423 |
| 2,844,489 | 7/58 | Gemmer | 117—20 |
| 3,020,210 | 2/62 | Stephens et al. | 202—26 |
| 3,053,704 | 9/62 | Munday | 148—20.3 |

OTHER REFERENCES

Coal Age, vol. 29, No. 9, March 4, 1926, pp. 325 to 327.

Gemmer: "Der Heutige Stand Des Kunststoffspritzens and Pulverisinterns," Industrie-Anzeiger, 75 Jahrgang, No. 12, Feb. 10, 1953, pp. 141-143.

Cline et al.: Vapor Deposition of Metals on Ceramic Particles, Journal of the Electrochemical Society, October 1951, pp. 385 to 387.

WILLIAM D. MARTIN, *Primary Examiner.*

RICHARD D. NEVIUS, *Examiner.*